United States Patent
Nishimura

(10) Patent No.: US 8,953,454 B2
(45) Date of Patent: Feb. 10, 2015

(54) APPARATUS FOR POLICING TRAFFIC IN A COMMUNICATION NETWORK

(71) Applicant: Fujitsu Limited, Kawasaki (JP)

(72) Inventor: Kazuto Nishimura, Yokohama (JP)

(73) Assignee: Fujitsu Limited, Kawasaki (JP)

(*) Notice: Subject to any disclaimer, the term of this patent is extended or adjusted under 35 U.S.C. 154(b) by 132 days.

(21) Appl. No.: 13/751,601

(22) Filed: Jan. 28, 2013

(65) Prior Publication Data
US 2013/0242742 A1    Sep. 19, 2013

(30) Foreign Application Priority Data
Mar. 19, 2012    (JP) ................................. 2012-062075

(51) Int. Cl.
*H04L 12/26* (2006.01)
*H04L 12/813* (2013.01)
*H04L 12/819* (2013.01)
*H04L 12/54* (2013.01)
*H04L 12/873* (2013.01)

(52) U.S. Cl.
CPC ............... *H04L 47/20* (2013.01); *H04L 47/21* (2013.01); *H04L 47/215* (2013.01); *H04L 12/5602* (2013.01); *H04L 47/52* (2013.01)
USPC .......................... 370/235.1; 370/429; 709/232

(58) Field of Classification Search
None
See application file for complete search history.

(56) References Cited

U.S. PATENT DOCUMENTS

2007/0299970 A1* 12/2007 Huang et al. ................... 709/225
2009/0213734 A1* 8/2009 Hashinaga et al. ........... 370/235

FOREIGN PATENT DOCUMENTS

JP    2004-336549    11/2004

* cited by examiner

*Primary Examiner* — Khoa Huynh
(74) *Attorney, Agent, or Firm* — Staas & Halsey LLP

(57) ABSTRACT

An apparatus for policing traffic in a communication network is provided. The apparatus includes a packet distributor, a plurality of policing units, and a token management unit. The packet distributor evenly distributes packets that have arrived at the apparatus. Each policing unit determines whether a packet distributed from the packet distributor is permitted to be passed or discarded in accordance with an amount of tokens remaining in a first token bucket provided for the each policing unit, and issues a token request for requesting supply of tokens when an amount of tokens remaining in the first token bucket falls below a first threshold value. The token management unit supplies tokens in units of a predetermined amount to the first token bucket for which the token request has been issued, in accordance with an amount of tokens remaining in a second bucket provided for the token management unit.

9 Claims, 15 Drawing Sheets

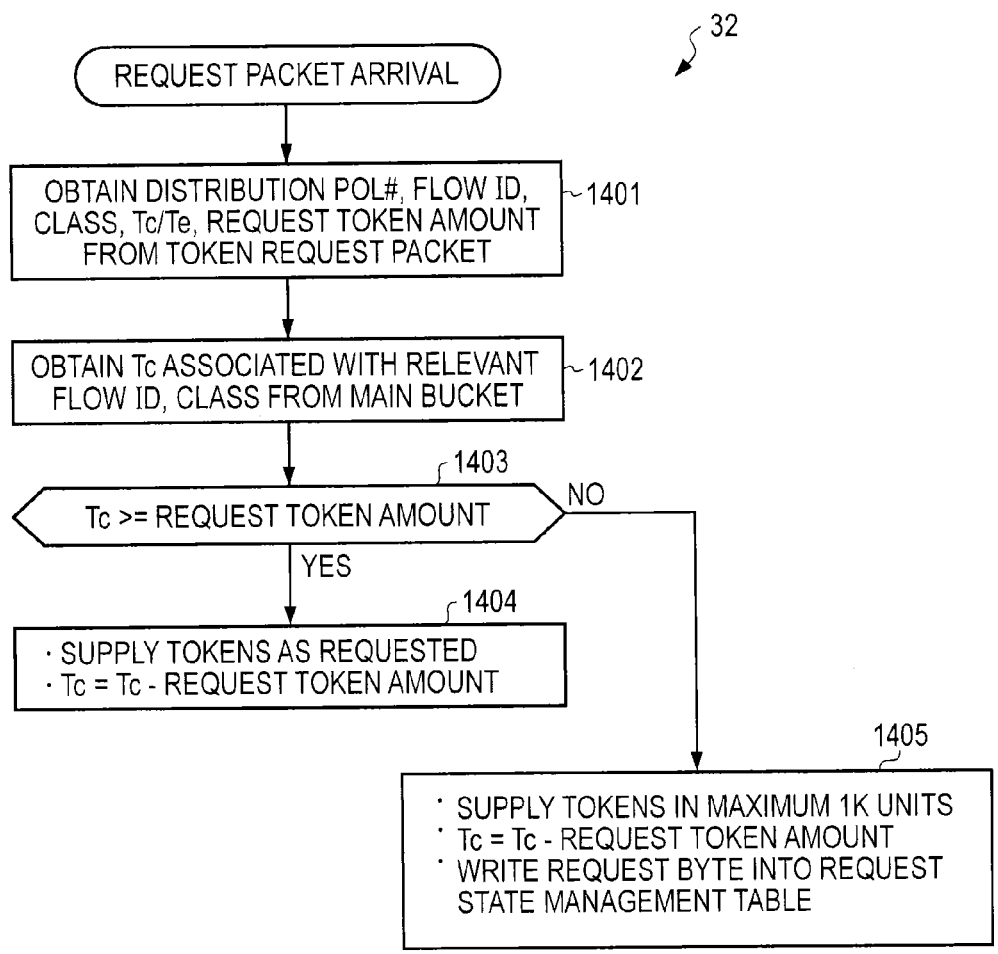

| flow# | class | Tc/Te | DISTRIBUTION POL # | REQUEST FLAG | REQUEST BYTE |
|---|---|---|---|---|---|
| 4 | A | Tc | 1 | 1 | 1000 |
| | | | 2 | 0 | - |
| | | | 3 | 0 | - |
| | | Te | 1 | 0 | - |
| | | | 2 | 1 | 3000 |
| | | | 3 | 0 | - |
| | B | Tc | 1 | 0 | - |
| | | | 2 | 0 | - |
| | | | 3 | 0 | - |
| | | Te | 1 | 1 | 2000 |
| | | | 2 | 1 | 8000 |
| | | | 3 | 1 | 5000 |
| ⋮ | ⋮ | ⋮ | ⋮ | ⋮ | ⋮ |

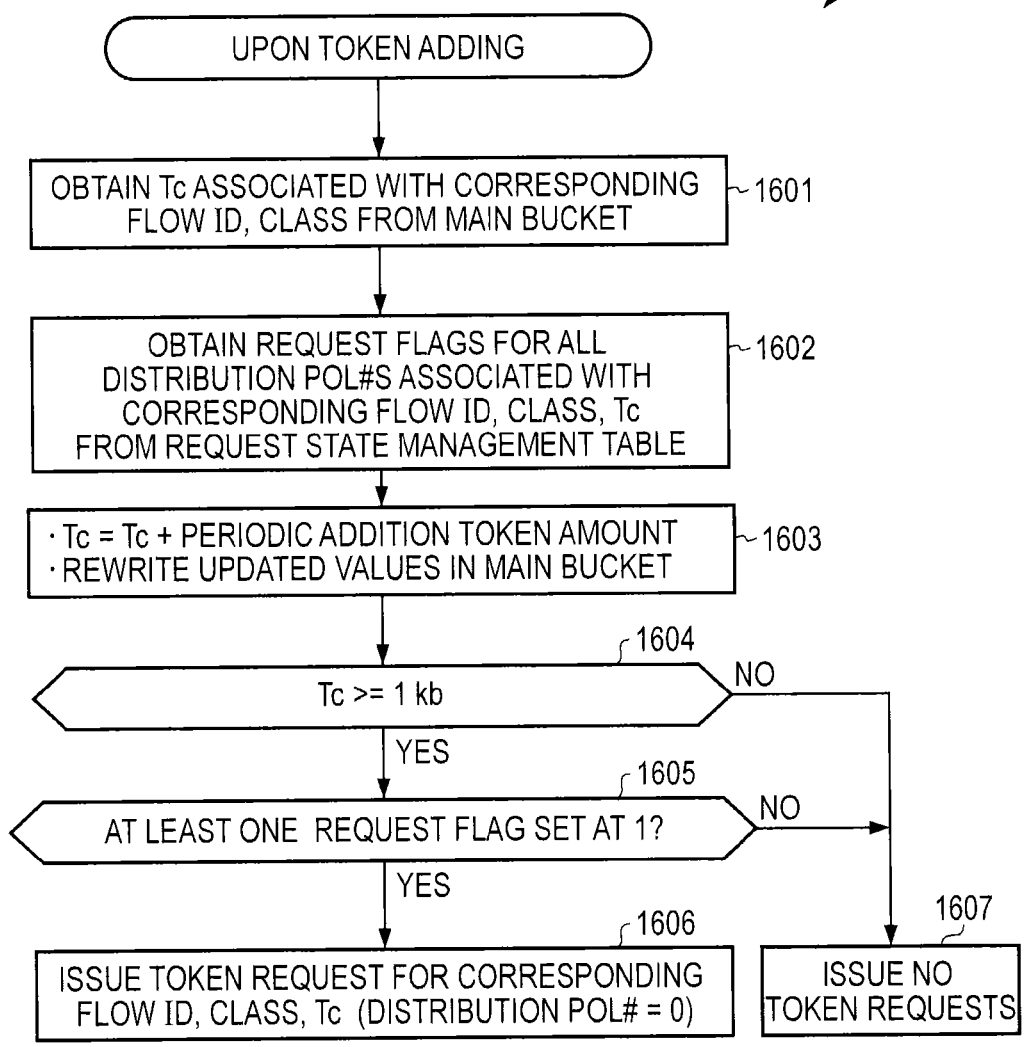

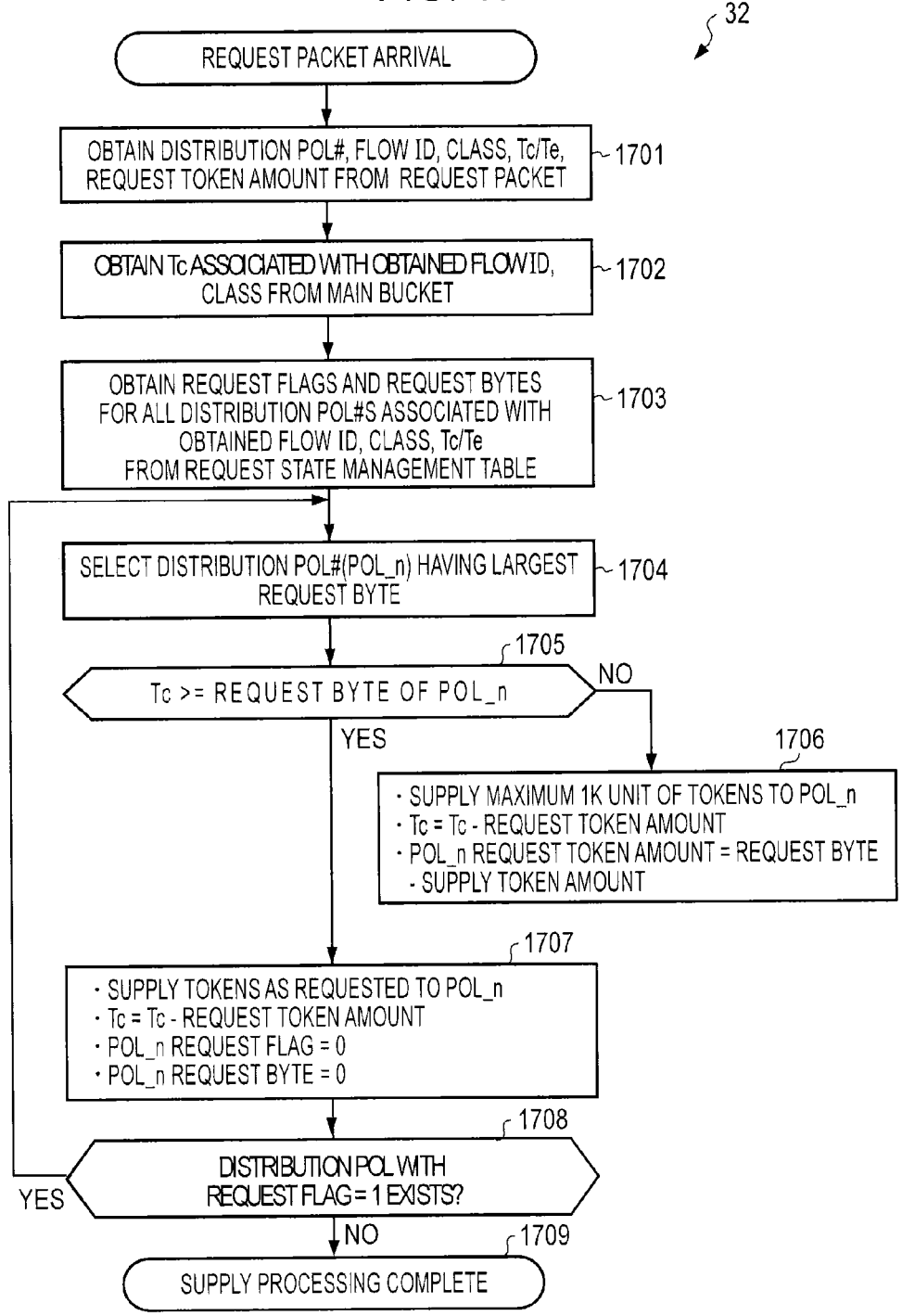

APPARATUS FOR POLICING TRAFFIC IN A COMMUNICATION NETWORK

CROSS-REFERENCE TO RELATED APPLICATION

This application is based upon and claims the benefit of priority of the prior Japanese Patent Application No. 2012-062075, filed on Mar. 19, 2012, the entire contents of which are incorporated herein by reference.

FIELD

The embodiment discussed herein is related to an apparatus for policing traffic in a communication network.

BACKGROUND

With recent high-speed interface support, packet processing devices for transmitting and receiving data in a packet form have almost reached internal processing speed limits. A policer having a policing function that is configured to be provided for such a packet processing device is expected to perform processes that are more complicated than simply adding and subtracting tokens. The trend for more complicated processing in a policer has become an obstructive factor for high-speed processing.

A countermeasure is desired to address the above conditions since accurate rate control that is the basis for policing may not be ensured.

Japanese Laid-open Patent Publication No. 2004-336549 discloses the related art.

FIG. 1 is a diagram illustrating a configuration example of a packet processing device including a policing function. In FIG. 1, the packet processing device 1 is, for example, a network configuration device having a packet processing function and existing on a communication network, such as a router, a switch, and switching equipment. The packet processing device 1 is equipped with a plurality of (n interface units, where n≥2) input/output interface units IF#1 to IF#n, input/output switches SWs, and a controller CONT.

The input/output interface units (which will be also simply described as interfaces) IF#1 to IF#n and the input/output switches (which will be also simply described as switches) SWs in the packet processing device 1 are mutually connected with each other and connected to the controller CONT via control lines indicated by dotted lines. The input/output interface units IF#1 to IF#n are connected to transmission lines (physical links) TLs of optical fiber and the like.

The controller CONT is equipped with: a processor PR1 that includes a central processing unit (CPU), a random access memory (RAM), and a read-only memory (ROM); and an information saving memory MM1 that is a non-volatile flash memory and that saves an operating system (OS), various application programs, and various types of information (including data), in a re-writable manner.

The interfaces IF#1 to IF#n have interfaces for performing the input and output of user data and the like. The switch units SWs are selectively connected to the interfaces IF#1 to IF#n via switches of switch fabric having a cross-connect function so as to transmit the user data and the like. The controller CONT transmits control information to the interfaces IF#1 to IF#n and the switch units SW, and includes functions such as managing the state of the entire device.

FIG. 2 is a diagram illustrating an example of an input/output interface unit in a packet processing device. The detailed configuration of the input/output interface units IF#1 to IF#n in the packet processing device 1 illustrated in FIG. 1 will be explained with reference to FIG. 2.

In an interface IF (IF#1 to IF#n), optical signals in a packet mode inputted through the optical fiber transmission lines TL are converted into electrical signals by optical modules MDs, and then inputted into a device PHY/MAC having a physical/media access control (PHY/MAC) processing function. Packet mode optical signals outputted through the transmission lines TLs are converted from electrical signals to optical signals by the optical modules MDs. The optical modules MD is configured, for example, using the small form-factor pluggable (SFP) standard that is one of standards for optical transceivers that connect communication devices to a fiber channel and gigabit Ethernet.

In the device PHY/MAC, packets are extracted and are outputted to a traffic processing unit at a subsequent stage of processing, such as a field programmable gate array (FPGA) or an application specific integrated circuit (ASIC). The FPGA or ASIC as a traffic processing unit performs traffic management processing such as traffic-policing and traffic-shaping.

The interface IF is equipped with a memory MM2 such as a packet data buffer or a setting table memory, where the packet data buffer and the setting table memory are used when the FPGA and the ASIC perform traffic management processing, respectively. The interface IF is further equipped with a processor PR2 including a CPU, a RAM, and a ROM, so as to be used for a user setting interface and software processing for collecting statistical information and the like.

A detailed configuration of the FPGA or ASIC illustrated in FIG. 2 will be described with reference to FIG. 3 by focusing on a policing function that is one type of traffic management processing implemented by the FPGA or ASIC as a traffic processing unit.

FIG. 3 is a schematic diagram illustrating an example of a policing function. As for a packet inputted into the FPGA or ASIC, as illustrated in FIG. 3, a flow identification unit FL refers to an identifier (ID) conversion table so as to obtain a flow identifier FID (e.g., FID=8) on the basis of a virtual local area network (VLAN) identifier VID (e.g., VID=2) included in the packet, and obtain, as need arises, a group identifier GID (e.g., GID=3). Then, the packet including the above mentioned identifier information as information within the packet, that is, as a payload of the packet, is inputted to a policer PL.

More specifically, a policing function is a function for limiting the traffic inputted into a communication network to a contractual bandwidth. In general, the policing function is often performed per a contractual unit called a flow. The policing function may also be performed per a group unit of a plurality of bundled flows.

These types of flows and groups are recognized in the policer PL by the flow identifier FID or the group identifier GID. The flow identifier FID and the group identifier GID are associated with a VLAN identifier VID that is information inside a packet for identifying a subscriber (user).

However, with support for recent high-speed interfaces, for example, in interface for a speed of 100 Gbps or more, a processing speed inside the packet processing device have almost reached the limit thereof. For example, when supporting a 100 Gbps throughput in the Ethernet, the following maximum packet processing performance is expected.

$$100\ \text{Gbps}/((64\ \text{bytes}+20\ \text{bytes})\times 8)=148.8\ \text{Mpps},$$

where "64 bytes" is the minimum packet length in Ethernet, and "20 bytes" is a fixed value obtained by adding the size of the preamble (8 bytes) and the minimum gap between frames (12 bytes). The above value of about 150 Mpps (pps: packets per second) indicates that only two clocks are given as a processing time for one process assuming that the operating frequency of the FPGA or ASIC is 300 MHz. This is derived from the fact that 300 MHz divided by two clocks equals 150 Mpps. The clock speed of 300 MHz is a value near to the limit for the current packet processing devices. Moreover, the processing time of two clocks is said to be an approximate architectural limit when considering that one clock is needed for each of memory reading and writing. That is, the performance required for packet processing has almost reached the limit of the current technologies.

This limit is also applicable to the policing functions in FPGA or ASIC. In addition, recent policers are becoming more complex and are configured to include various policing functions such as, a function of coloring determination (2-rate 3-color policer (for details, refer to RFC 2698 or ME F10 for example)) based on a committed information rate (CIR) and an excess information rate (EIR), a hierarchy type of functions handling tokens overflowing between classes (CoS: class of service), and a group type of functions which perform policing in group units of bundled flows. That is, more complex processing that goes beyond merely adding and subtracting tokens associated with the authority for transmitting packets is required. This becomes one of impediments to the high-speed processing.

FIG. 4 is a schematic diagram illustrating a configuration example of a complex policer. The policer PL1 is equipped with a policing unit 2, a token bucket memory 3, and a token adding unit 4. The policing unit 2 has functions, for example, for determining passing or discarding packets in each flow, for determining passing or discarding packets in each group, for adjusting results between the flows or between the groups, for subtracting tokens from each flow, for subtracting tokens from each group, and for determining coloring.

The token bucket memory 3 in the policer PL1 includes a token bucket counter for each of a flow and a class, and a token bucket counter for a group. The token bucket counter includes a token bucket counter Tc for CIR and a token bucket counter Te for EIR.

The token adding unit 4 includes functions, for example, for supplying tokens to each flow, supplying tokens to each group, supplying tokens that have overflowed the token bucket counters Tc or Te (coupling processing), and supplying tokens that have overflowed classes (hierarchy processing). The policing unit 2 and the token adding unit 4 carry out the functions based on the result of reading out and updating the amount of remaining tokens indicated by counter values of the token bucket counter Tc and Te in the token bucket memory 3.

SUMMARY

According to an aspect of the invention, an apparatus for policing traffic in a communication network is provided. The apparatus includes a packet distributor, a plurality of distribution policing units, and a concentrated token management unit. The packet distributor evenly distributes packets that have arrived at the apparatus, among the plurality of distribution policing units. Each of the plurality of distribution policing units determines whether a packet distributed from the packet distributor is permitted to be passed or discarded in accordance with an amount of tokens remaining in a first token bucket provided for the each distribution policing unit, and issues a token request for requesting supply of tokens when an amount of tokens remaining in the first token bucket falls below a first threshold value. The concentrated token management unit supplies tokens in units of a predetermined amount to the first token bucket for which the token request has been issued, in accordance with an amount of tokens remaining in a second bucket provided for the concentrated token management unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a diagram illustrating an example of a token request packet, according to an embodiment;

FIG. 14 is a diagram illustrating an example of an operational flowchart performed by a token supply unit, according to an embodiment;

FIG. 15 is a diagram illustrating an example of a request state management table, according to an embodiment;

FIG. 16 is a diagram illustrating an example of an operational flowchart performed by a token addition unit, according to an embodiment; and FIG. 17 is a diagram illustrating an example of an operational flowchart performed by a token supply unit, according to an embodiment.

DESCRIPTION OF EMBODIMENTS

In order to address the problem of impediments to the high-speed processing, arising from the complex policer PL1 that has been described above with reference to FIG. 4, it is conceivable to adopt a simple load distribution method for the policing functions.

Figure 5:
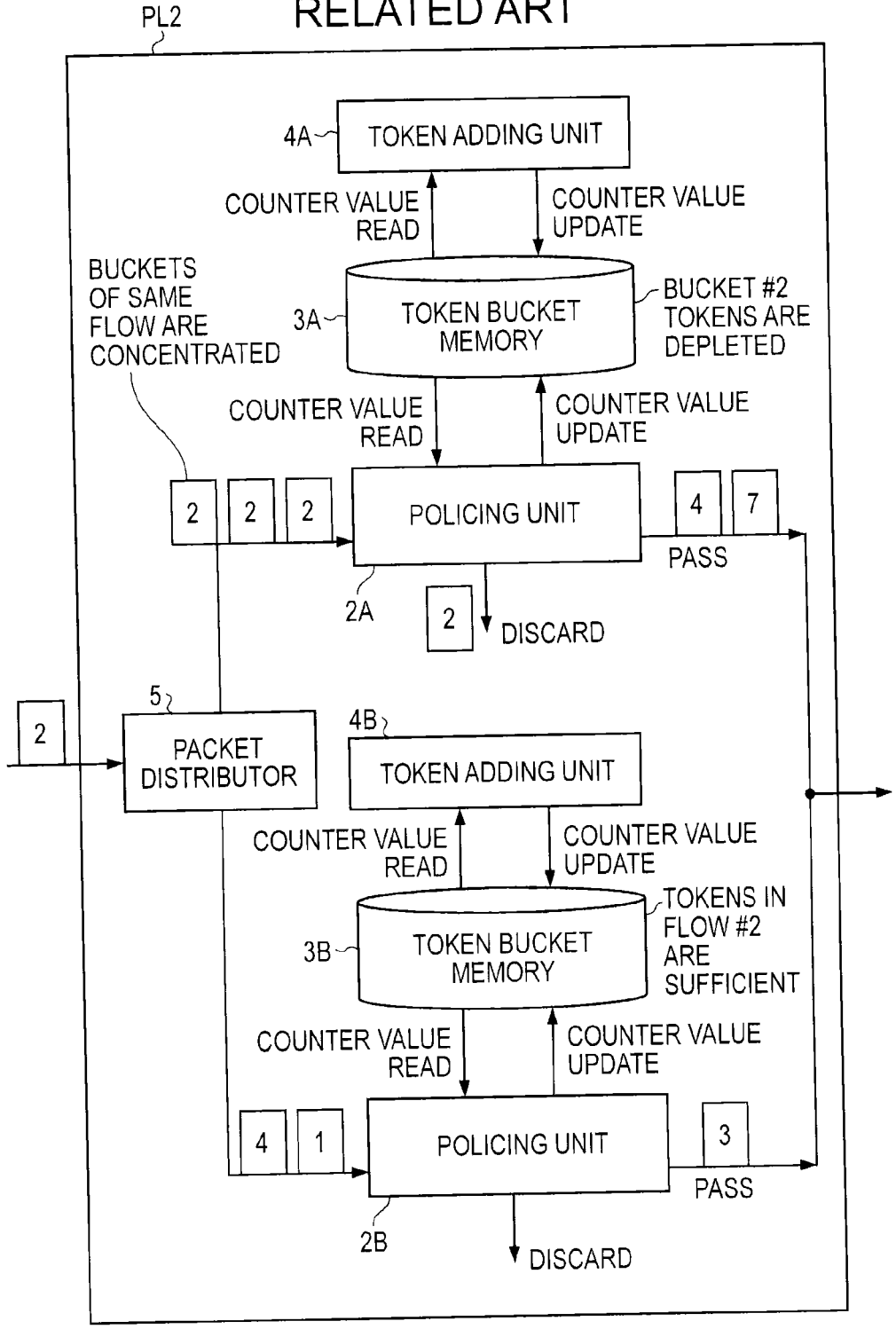
FIG. 5 is a diagram illustrating a configuration example of a policer implementing a simple load distribution method.

FIG. 5 is a diagram illustrating a configuration example of a policer implementing a simple load distribution method.

Figure 4:
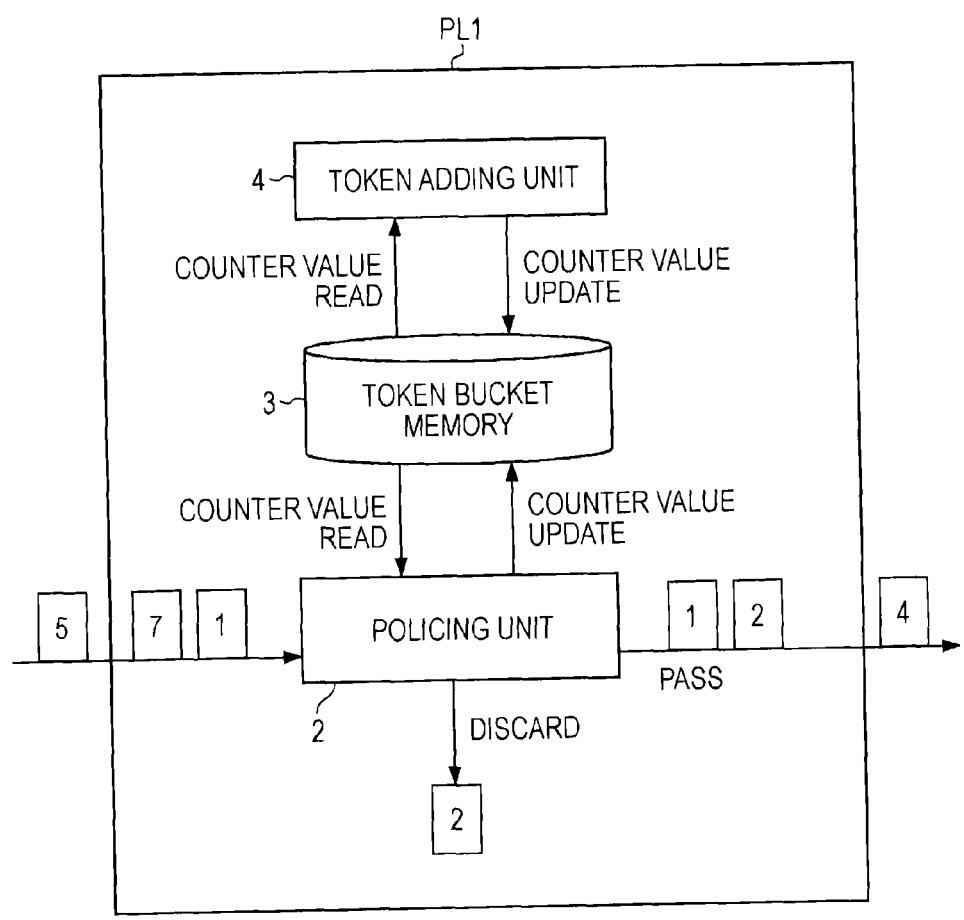
FIG. 4 is a schematic diagram illustrating a configuration example of a complex policer.

The policer PL2 is equipped with policing units 2A and 2B, token bucket memories 3A and 3B, and token adding units 4A and 4B in a twin system that have the same respective functions as the policing unit 2, the token bucket memory 3, and the token adding unit 4, in the policer PL1 illustrated in FIG. 4. The policer PL2 is further provided with a packet distributor 5 whose processing is performed prior to that of the policing units 2A and 2B. The packet distributor 5 has a toggle function for distributing packets in turns to the first system policing unit 2A and the second system policing unit 2B without identifying a flow (namely, the flow identifier FID) of the arrived packet.

As a result, since the packet arrival speed of 148.8 Mpps for each policing unit becomes at most 74.4 Mpps which is half of the packet arrival speed for the policer PL2, the policing units 2A and 2B are each able to perform processing at half of the processing performance of 100 Gb/s. In the case, two token bucket memories need to be provided, that is, the token bucket memory 3A associated with the first system policing unit 2A and the token bucket memory 3B associated with the second system policing unit 2B need to be provided. Moreover, respective token supply rates from the token adding units 4A and 4B, and respective bucket sizes of the token bucket memories 3A and 3B need to be halved in order to maintain a rate of passing traffic at the setting value.

However, in this case, it is not known whether a packet belonging to each flow will be distributed to the first system policing unit 2A or the second system policing unit 2B. In the policer PL2 that has adopted the above simple load distribution method, since the packets are distributed by the packet distributor 5 without identifying each of flows, packets belonging to a specific flow are liable to be biased to one of the first system policing unit 2A and the second system policing unit 2B. FIG. 5 illustrates an example in which packets belonging to the same flow (packets of flow #2) are concentrated in the first system policing unit 2A.

As a result, for example, only the tokens (tokens corresponding to flow #2) stored in the token bucket of the token bucket memory 3A are consumed and exhausted despite the fact that there exist enough tokens (tokens associated with flow #2) left in the token bucket of the token bucket memory 3B.

In addition, as described above, since the token supply rate from each of the token adding units 4A and 4B is halved, only half of the packets of the setting rate may pass. For example, in the worst case, packets are passed at only ½ of the setting rate. This segmentation loss increases with increase in the number of distribution systems. As a result, the simple load distribution method described above fails to ensure an accurate rate limit that is a basis for policing traffic.

Hereinafter, embodiments will be described in detail with reference to the drawings. Although preferred embodiments are illustrated in the drawings, many different embodiments may be implemented and the present disclosure is not limited to the embodiments described herein.

Configuration and Function of Policer

Figure 6:
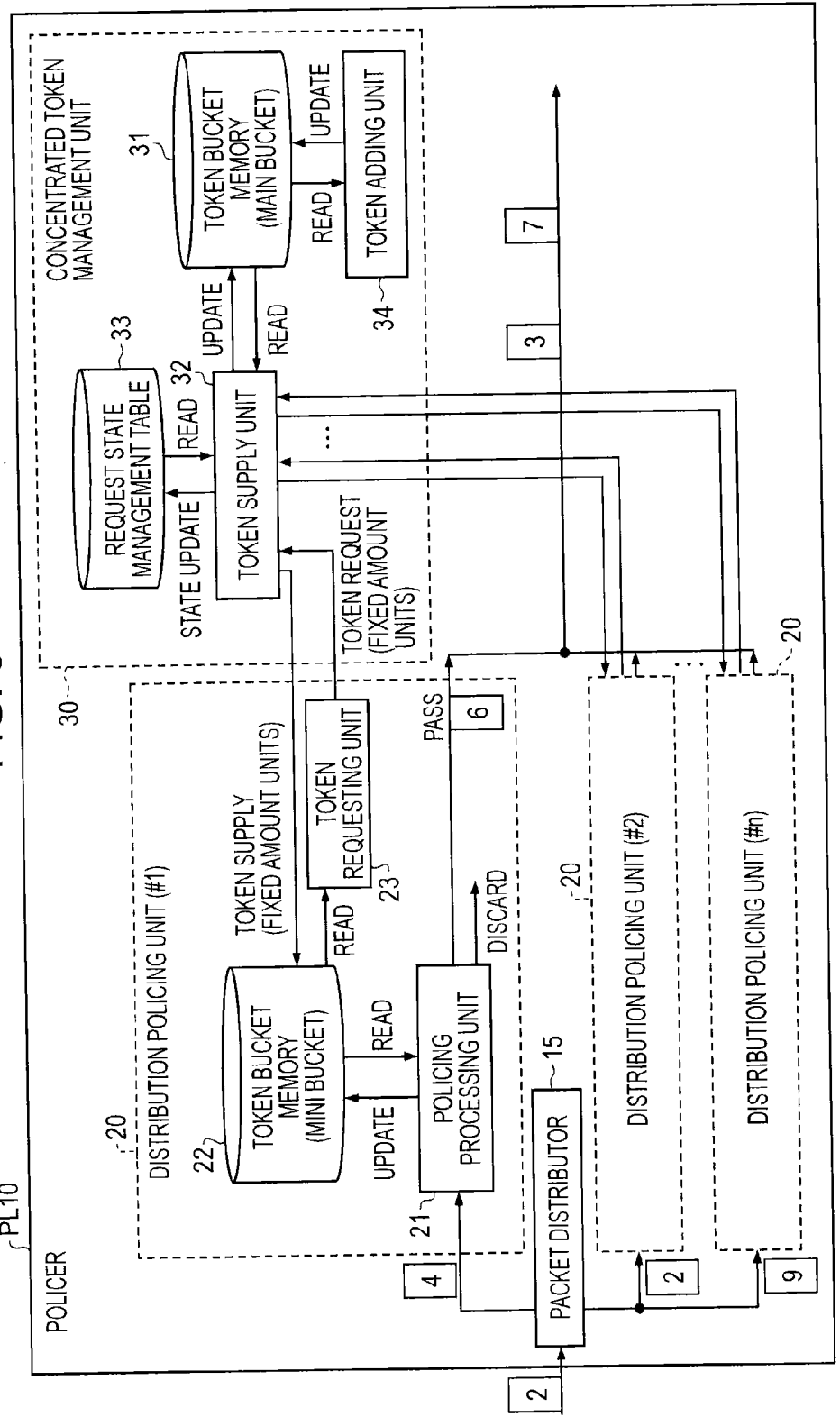
FIG. 6 is a diagram illustrating a configuration example of a policer, according to an embodiment.

FIG. 6 is a diagram illustrating a configuration example of a policer, according to an embodiment. In FIG. 6, the policer PL10 having a load distribution policing function includes a packet distributor 15 that evenly distributes arrived packets among a plurality of distribution policing units so that an equal number of packets arrive at each of the plurality of distribution policing units, the plurality of (n units, where n≥2) of distribution policing units 20 each performing a determination whether a packet is to be passed or discarded, and a concentrated token management unit 30 that performs comprehensive token management.

Figure 1:
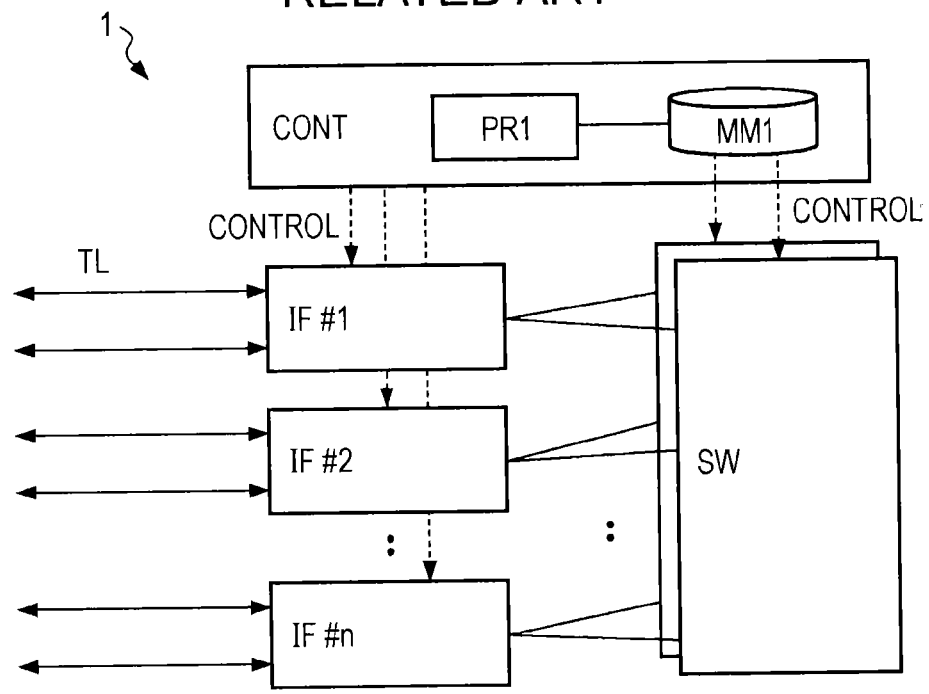
FIG. 1 is a diagram illustrating a configuration example of a packet processing device including a policing function.
Figure 2:
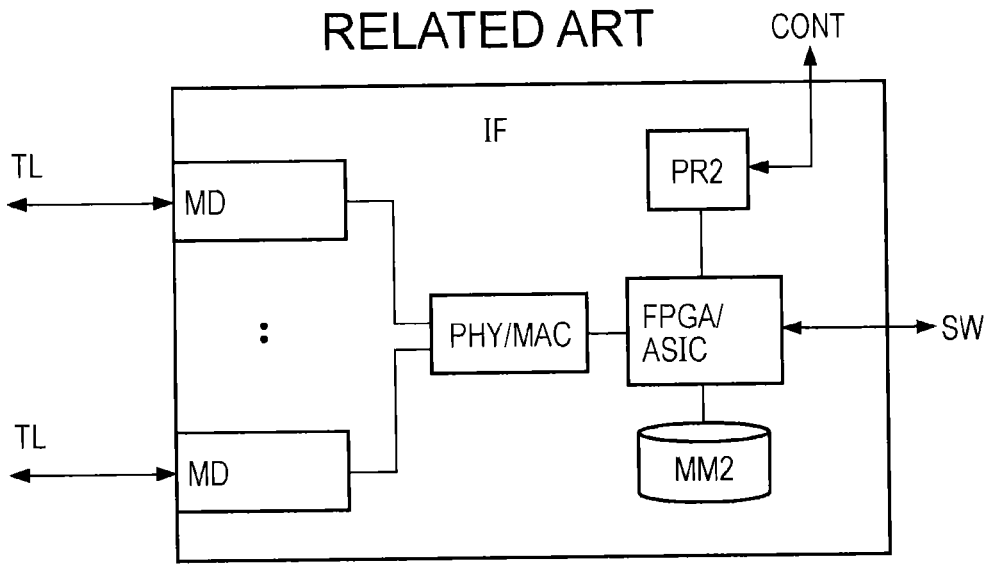
FIG. 2 is a diagram illustrating an example of an input/output interface unit in a packet processing device.
Figure 3:
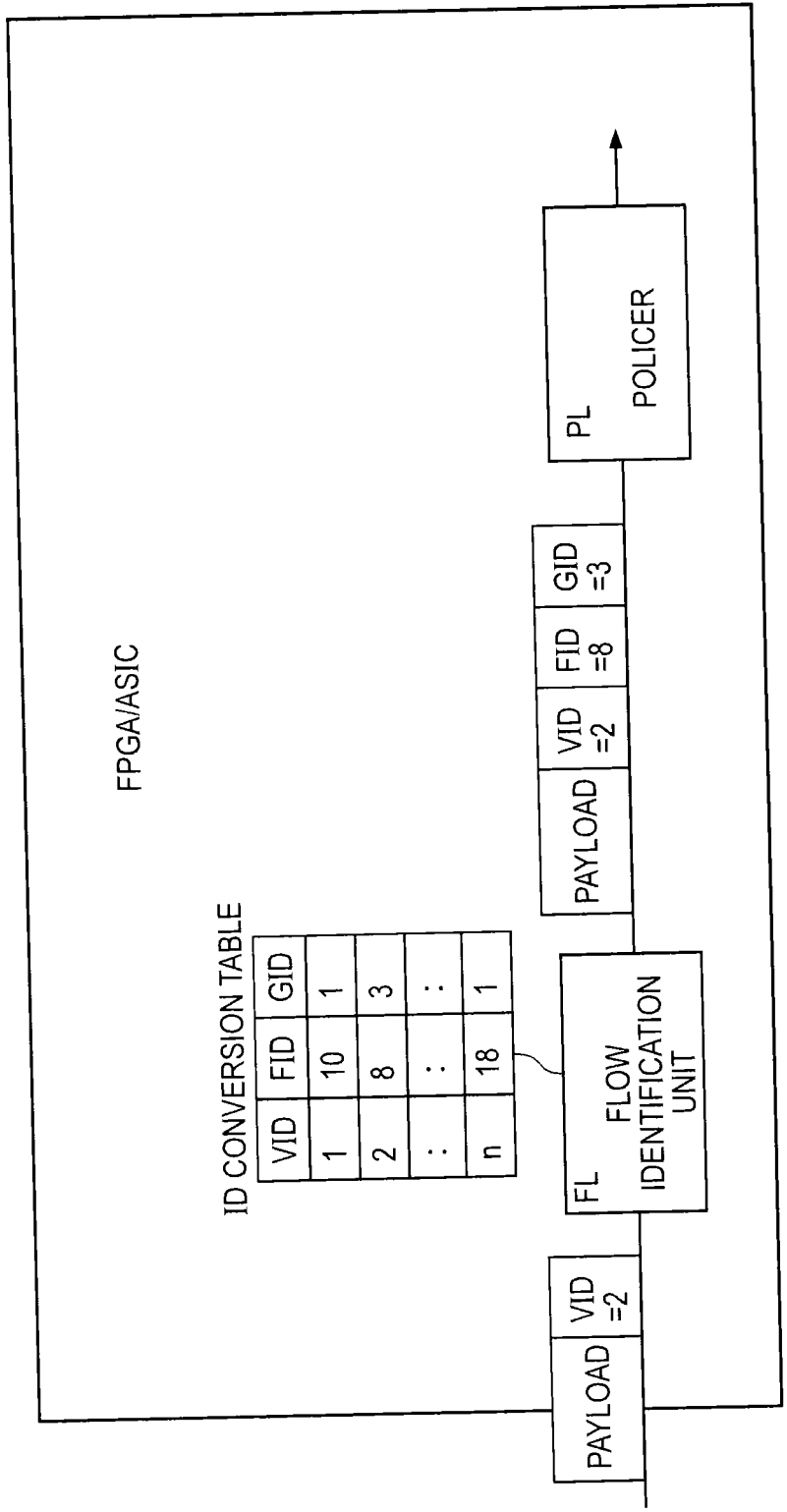
FIG. 3 is a schematic diagram illustrating an example of a policing function.

The policer PL10, for example, may be disposed in an FPGA or ASIC of the interface in the packet processing device illustrated in FIG. 1.

The distribution policing units (#1 to #n) 20 in the policer PL10 includes a policing processing unit 21, a token bucket memory 22, and a token requesting unit 23. The policing processing unit 21 performs determination whether a packet is to be passed or discarded, token subtraction, and coloring determination, with respect to packets evenly distributed by the packet distributor 15. The token bucket memory (hereinafter, will be also referred to below as "mini bucket") 22 is individually provided for the policing processing unit 21 and holds a token-amount value indicating the amount of remaining tokens in association with each flow and each class. The token requesting unit 23 requests tokens (token supply request) in accordance with the authority of transmitting packets, based on the amount of remaining tokens in the mini bucket 22. Hereinafter, "a value indicating the amount of tokens" will be also expressed simply as "tokens" for ease of explanation.

Further, the concentrated token management unit 30 includes a token bucket memory 31, a token supply unit 32, a request state management table 33, and a token adding unit 34. The token bucket memory (hereinafter, will be also referred to as "main bucket") 31 holds tokens remaining in each flow and each class and tokens remaining in each group as needed basis. The token supply unit 32 supplies tokens to the mini bucket 22 and subtracts tokens from the main bucket 31, based on the requests from the token requesting unit 23. The request state management table 33 holds information on states of token requests issued by the plurality of distribution policing units 20. The token adding unit 34 adds tokens to the main bucket 31 and performs token overflow processing (coupling processing, hierarchy processing) as needed basis.

The amount of remaining tokens in the mini bucket 22 and the amount of remaining tokens in the main bucket 31 are each represented by counter values indicated by a token bucket counter Tc for committed information rates CIR and a token bucket counter Te for excess information rates EIR which are held in the memory of the mini bucket 22 or the main bucket 31. Hereinafter, the amounts of remaining tokens corresponding to the counters Tc and Te will be also described using the same reference numerals Tc and Te, respectively, for ease of explanation.

The policing processing unit 21 of the distribution policing units 20 refers to the mini bucket 22 to determine whether the distributed packet is permitted to be passed or discarded. When the packet is permitted to be passed based on the above pass-or-discard determination, the policing processing unit 21 subtracts tokens of a byte length corresponding to the packet that have been passed, only from the remaining tokens for the corresponding flow and class in the mini bucket 22. Meanwhile, since the policing processing unit 21 discards the distributed packet when the amount of remaining tokens is insufficient, the amount of remaining tokens does not change in the mini bucket 22. That is, the pass-or-discard determination that is performed on each packet by the policing processing unit 21 of the policer PL10 is implemented only based on the amount of remaining tokens in the mini bucket 22 without involving the main bucket 31.

When the amount of remaining tokens in the mini bucket 22 falls below a threshold (a normal token-request threshold value), the token requesting unit 23 issues a token request to the concentrated token management unit 30. The amount of tokens requested by the token request is made in units of a fixed amount. For example, when the fixed amount is 1000 bytes, the token requesting unit 23 requests 1000-byte tokens even if the amount of remaining tokens falls only 100 bytes below the threshold. The token requesting unit 23 requests 5000-byte tokens when the amount of remaining tokens falls 4500 bytes below the threshold.

The token supply unit 32 in the concentrated token management unit 30 that has received the token request from the token requesting unit 23 reads out, from the main bucket 31, the amount of remaining tokens associated with the corresponding flow and class. When the token supply unit 32 performs group policing concurrently, the token supply unit 32 also reads out the amount of remaining tokens associated with the corresponding group.

In response to a token request issued from the token requesting unit 23, when the token supply unit 32 determines that the amount of remaining tokens in the main bucket 31 is equal to or greater than the amount of tokens requested by the token request, based on the above information (the amount of remaining tokens), the token supply unit 32 supplies (pays out) tokens to the mini bucket 22 and subtracts tokens equivalent to the supplied tokens from the main bucket 31.

Furthermore, when it is determined that the amount of remaining tokens in the main bucket 31 is insufficient, the token supply unit 32 writes state information indicating reception of the token request, in the request state management table 33, and supplies tokens to the distribution policing units 20 that has issued the token request when a sufficient amount of tokens are accumulated in the main bucket 31.

The token adding unit 34 supplies tokens at certain intervals on the basis of the setting rate. The token adding unit 34 also performs token overflow processing such as processing for a coupling mode based on the RFC 2698 and the MEF 10.2 specification. That is, in the policer PL10, comprehensive token management is only performed with respect to the main bucket 31.

Figure 7:
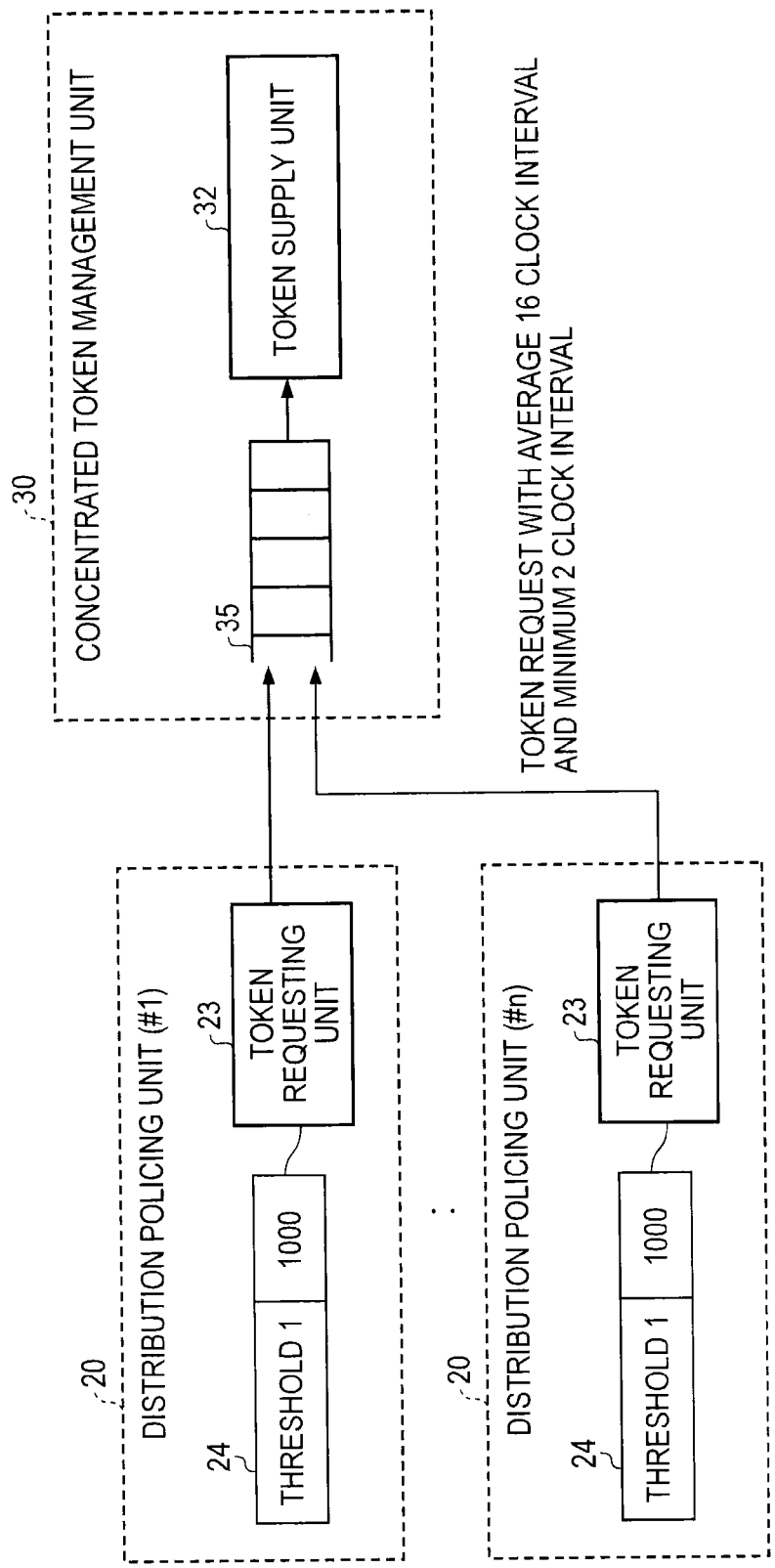
FIG. 7 is a diagram illustrating a configuration example of a policer, according to an embodiment.

FIG. 7 is a diagram illustrating a configuration example of a policer, according to an embodiment. As illustrated in FIG. 7, the concentrated token management unit 30 of the policer PL10 according to the abovementioned embodiment may also be configured to include a request waiting buffer 35 that is provided on the upstream side of the token supply unit 32 and temporarily stores token requests issued from the token requesting units 23 provided for the plurality of distribution policing units 20, prior to delivering the token requests to the token supply unit 32.

When the request waiting buffer 35 is provided on the upstream side of the token supply unit 32, a threshold table 24 which is referred to by the token requesting unit 23 is configured to set a normal token-request threshold value (threshold 1).

With the request waiting buffer 35 and the threshold table 24, when token requests from the token requesting unit 23 have arrived in a bursty state, the token requests may be temporarily stored so that the token supply unit 32 performs token-request control processing on the token requests in order of arrival.

For example, when the packet distributor 15 distributes consecutive packets (packet 1, packet 2) belonging to a specific flow to the distribution policing unit (#1) 20 and the distribution policing unit (#2) 20, respectively, both the consecutive packets are permitted to be passed, and both the token subtraction results fall below the threshold 1, the token requests issued from both of the distribution policing unit (#1) 20 and the distribution policing unit (#2) 20 concurrently arrive at the token supply unit 32.

In this case, the token supply unit 32 is requested to perform high-speed processing since the interval of the token requests from the distribution policing unit (#1) 20 and the distribution policing unit (#2) 20 is differentiated only by the difference in the arrival times of the packets. With provision of the request waiting buffer 35 for temporarily storing token requests, token requests that are unable to be concurrently processed due to the limitation of processing performance of the token supply unit 32 are made to wait in the request waiting buffer 35. This allows the token supply unit 32 with low processing performance to perform processing on the token requests. As a result, for example, even when an average interval is 16 clocks but token requests arrive in a bursty state at a minimum interval of two clocks, it is possible to reduce the processing speed of the token supply unit 32 so that the token supply unit 32 performs the processing in units of four clocks.

Figure 8:
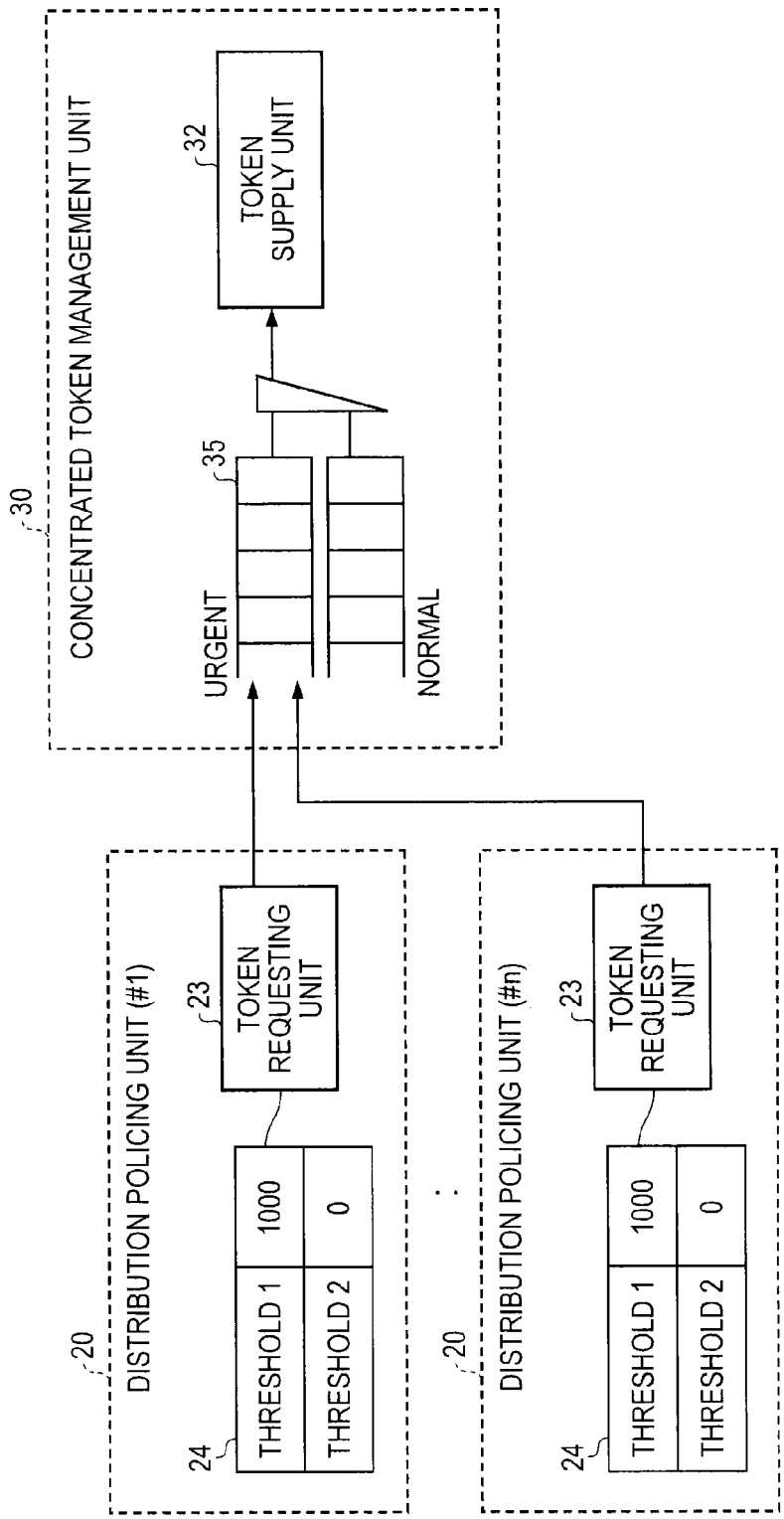
FIG. 8 is a diagram illustrating a configuration example of a policer, according to an embodiment.

FIG. 8 is a diagram illustrating another configuration example of a policer, according to an embodiment. As illustrated in FIG. 8, the concentrated token management unit 30 of the policer PL10 according to the abovementioned embodiment may be configured to include, on the upstream side of the token supply unit 32, the request waiting buffer 35 including an urgent queue and a normal queue.

When the request waiting buffer 35 in this form is provided on the upstream side of the token supply unit 32, the threshold table 24 that is referred to by the token requesting unit 23 is configured to set an urgent token-request threshold value (threshold 2) for a high level of urgency in addition to the normal token-request threshold value (threshold 1).

The request waiting buffer 35 and the threshold table 24 as mentioned above allows the token requesting unit 23 to transmit an urgent token request when the amount of remaining tokens in the mini bucket 22 falls below the threshold 2, and allows the token supply unit 32 to perform token request priority control for reading out on a priority basis the urgent token requests from the request waiting buffer 35.

For example, assume that in the threshold table 24, the threshold 1 is beforehand set at 1000 bytes and the threshold 2 is beforehand set at 0 bytes. Although the token requesting unit 23 issues a normal token request when the amount of remaining tokens falls below the threshold 1, supply of tokens to the mini bucket 22 may not be performed in time when the request waiting buffer 35 happens to be congested and the mini bucket 22 has suddenly entered a state of shortage in the amount of remaining tokens due to the arrival of relatively large packets. In the case, when the amount of remaining tokens falls below the threshold 2, an urgent token request is issued from the token requesting unit 23 so that token-supply processing is performed on a priority basis through the urgent queue of the request waiting buffer 35.

Figure 9:
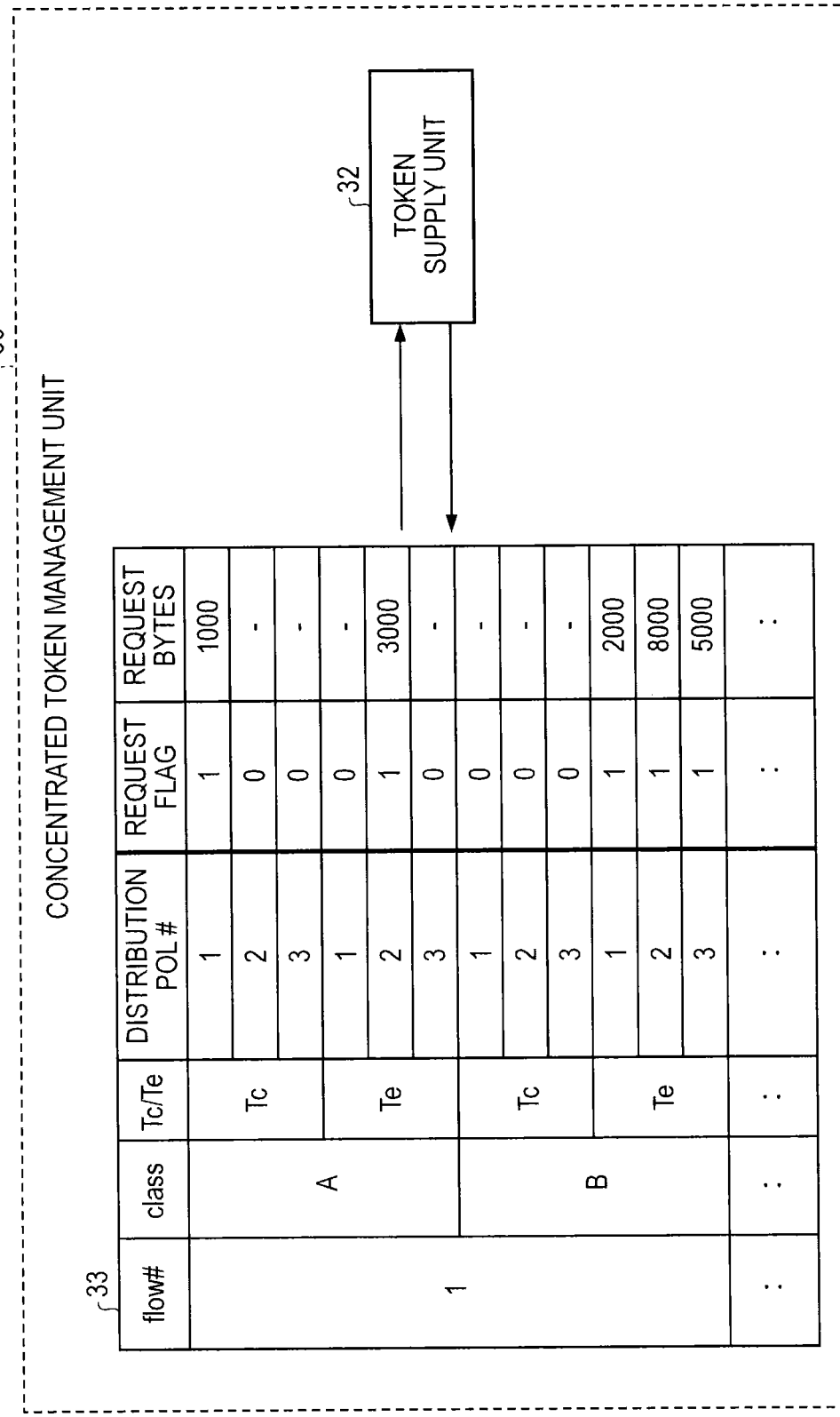
FIG. 9 is a diagram illustrating an example of a request state management table, according to an embodiment.

FIG. 9 is a diagram illustrating an example of a request state management table, according to an embodiment. Referring to FIGS. 6 and 9 together, the token supply unit 32 in the concentrated token management unit 30 of the policer PL10 according to the abovementioned embodiment performs token-supply candidate determination control in such a manner that the token supply unit 32 refers to the request state management table 33 when token requests with respect to flows and classes whose tokens in the main bucket 31 are exhausted arrive from the plurality of distribution policing units (#1 to #n) 20, and supplies tokens to the plurality of distribution policing units 20 in order defined in advance (for example, in ascending order of unit number assigned to each distribution policing unit).

That is, the token supply unit 32 of the concentrated token management unit 30 may enter a state in which tokens in the main bucket 31 are exhausted and token requests arrive from the plurality of distribution policing units 20 when a rate of the inputs (receiving token requests) are constantly higher than a policing rate. In this case, although it becomes possible to supply tokens when tokens are added from the token adding unit 34 and the amount of the added tokens exceeds a fixed amount, tokens are supplied to only one of the plurality of distribution policing units 20.

Accordingly, supplying the tokens to the plurality of distribution policing units (#1 to #n) 20 is performed, for example, by supplying the tokens first to the first distribution policing unit (#1) 20 in ascending order of unit number assigned to the distribution policing units 20.

Alternatively, it is also possible to supply tokens to the plurality of distribution policing units 20 in descending order of the amount of tokens requested by the distribution policing units 20. For example, in the exemplary request state management table 33 in FIG. 9, tokens are supplied to the second distribution policing unit (#2) 20 having the largest number of request bytes.

Policer Operation Example

Next, an example of a load distribution policing operation by the policer PL10 of an embodiment illustrated in FIGS. 6 to 9 will be described with reference to FIGS. 10 to 17.

Figure 10:
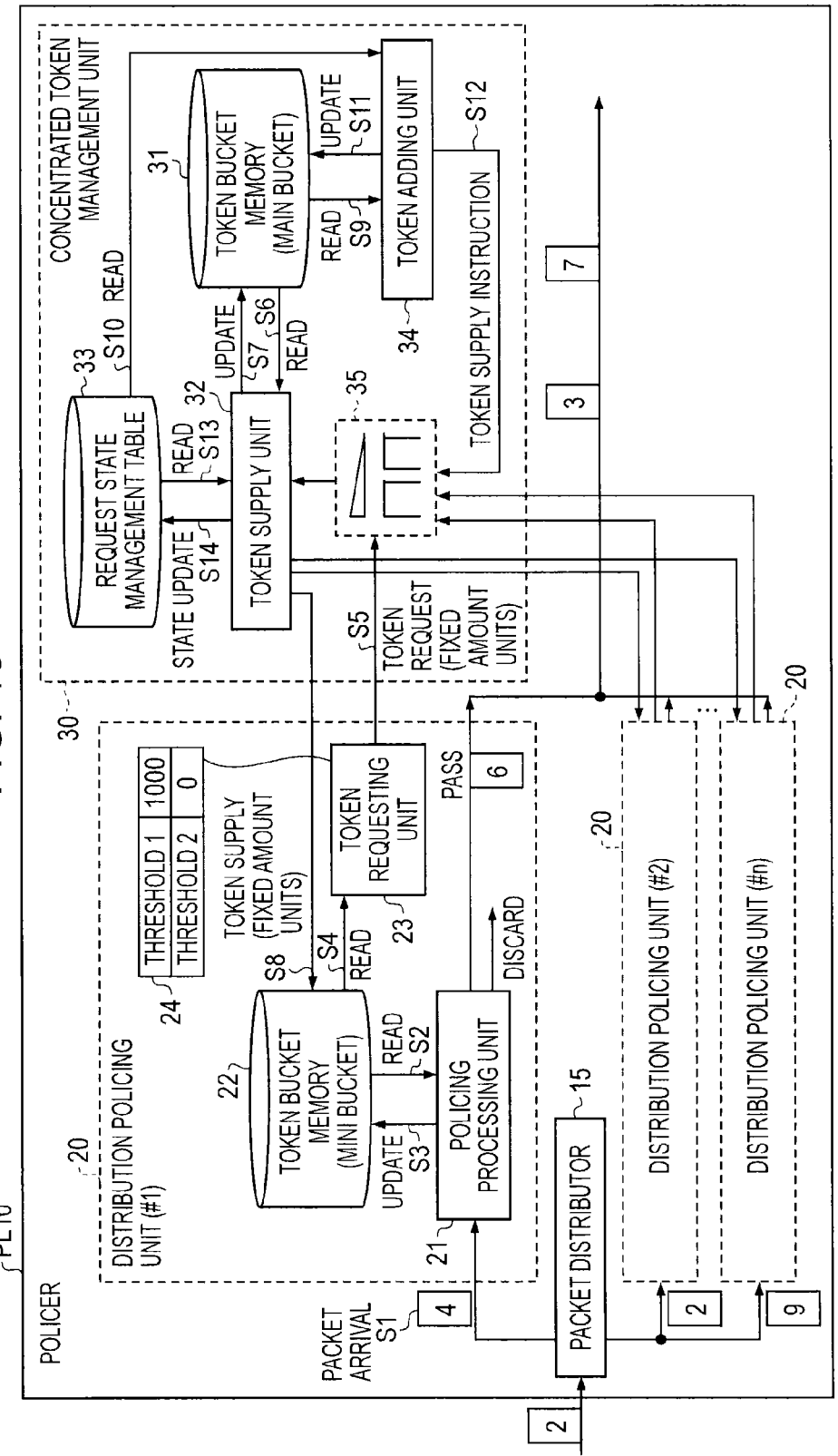
FIG. 10 is a diagram illustrating an example of an operational sequence for distributing a load among a plurality of distribution policing units, according to an embodiment.

FIG. 10 is a diagram illustrating an example of an operational sequence for distributing a load among a plurality of distribution policing units, according to an embodiment. In FIG. 10, an example of an operational sequence for distributing a load among a plurality of distribution policing units will be explained with the policer PL10 having three distribution policing units (#1 to #3) 20.

In the case, the policer PL10 is assumed to perform 2-rate 3-color policing (coloring determination) processing for each flow and each class. Further, it is assumed that a fixed amount of unit for processing tokens is 1000 bytes (1 kB), the threshold 1 (normal token-request threshold value) is set at 1000 bytes, and the threshold 2 (urgent token-request threshold value) is set at 0 bytes.

When packets arrive at the policer PL10 via a 100 gigabyte Ethernet interface (100 GE-IF), the packets are distributed by the packet distributor 15 among the three distribution policing units (#1 to #3) 20 in predetermined order. For example, the packet distributor 15 distributes packets in round-robin fashion so that the packets are distributed evenly among the distribution policing units (#1 to #3) 20.

Figure 11:
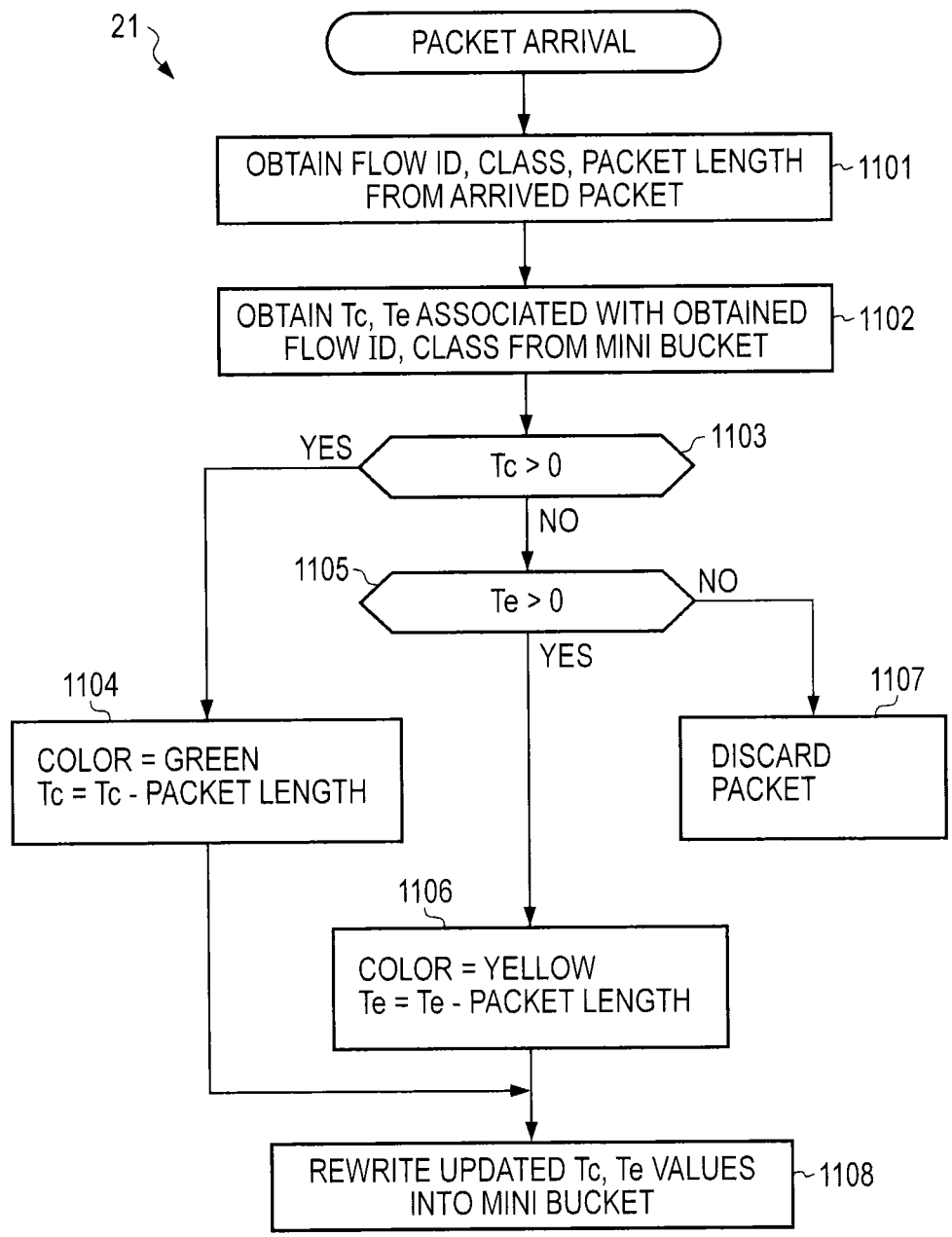
FIG. 11 is a diagram illustrating an example of an operational flowchart performed by a policing processing unit, according to an embodiment.

FIG. 11 is a diagram illustrating an example of an operational flowchart performed by a policing processing unit, according to an embodiment. The policing processing unit 21 in each of the distribution policing units (#1 to #3) 20 starts processing upon arrival of a packet distributed from the packet distributor 15. Operations performed by a policing processing unit 21 are described in association with the operations S1 to S3 depicted in FIG. 10.

In operation S1101, when a packet has arrived (as depicted by S1 in FIG. 10), the policing processing unit 21 in the distribution policing unit (#1) 20 obtains, from the arrived packet, the flow identifier FID=4, the class=B, and the packet length=700 bytes.

In operation S1102, the policing processing unit 21 reads out (obtains) mini bucket information corresponding to the flow identifier FID=4 and the class=B, that is, the Tc indicating the amount of remaining tokens (herein after, will be also expressed as "remaining token amount") for the committed information rate CIR and the Te indicating the amount of remaining tokens (remaining token amount) for the excess information rate EIR, from the mini bucket 22 (as depicted by S2 in FIG. 10).

The policing processing unit 21 then performs packet pass-or-discard determination, coloring determination, and token subtraction processing, on the basis of the amount of remaining tokens Tc and Te that have been read out from the mini bucket 22 and furthermore on the basis of the length of the arrived packet.

For example, when the Tc equals 500 and the Te equals 1000, that is, when Tc>0 in operation S1103, the packets are colored green and passed and the packet length "700" is subtracted from the Tc "500", in operation S1104. IN the case, the Tc takes on "−200" and the Te takes on "1000" as a result of the token subtraction.

When the Tc equals "−100" and the Te equals "1000", that is, when Tc≤0 (NO in operation S1103) and Te>0 (YES in operation S1105), the packets are colored yellow and passed, and the packet length "700" is subtracted from the Te "1000" in operation S1106. In the case, the Tc takes on "−100" and the Te takes on "300" as a result of the token subtraction.

When the Tc equals "−200" and the Te equals "−100", that is, when Tc≤0 (NO in operation S1103) and Te≤0 (NO in operation S1105), the packet is colored red and discarded in operation S1107, and the values of the Tc and Te stay the same.

In operation S1108, the updated values of the Tc and the Te as a result of the above processing are rewritten into the mini bucket 22 (as depicted by S3 in FIG. 10).

Figure 12:
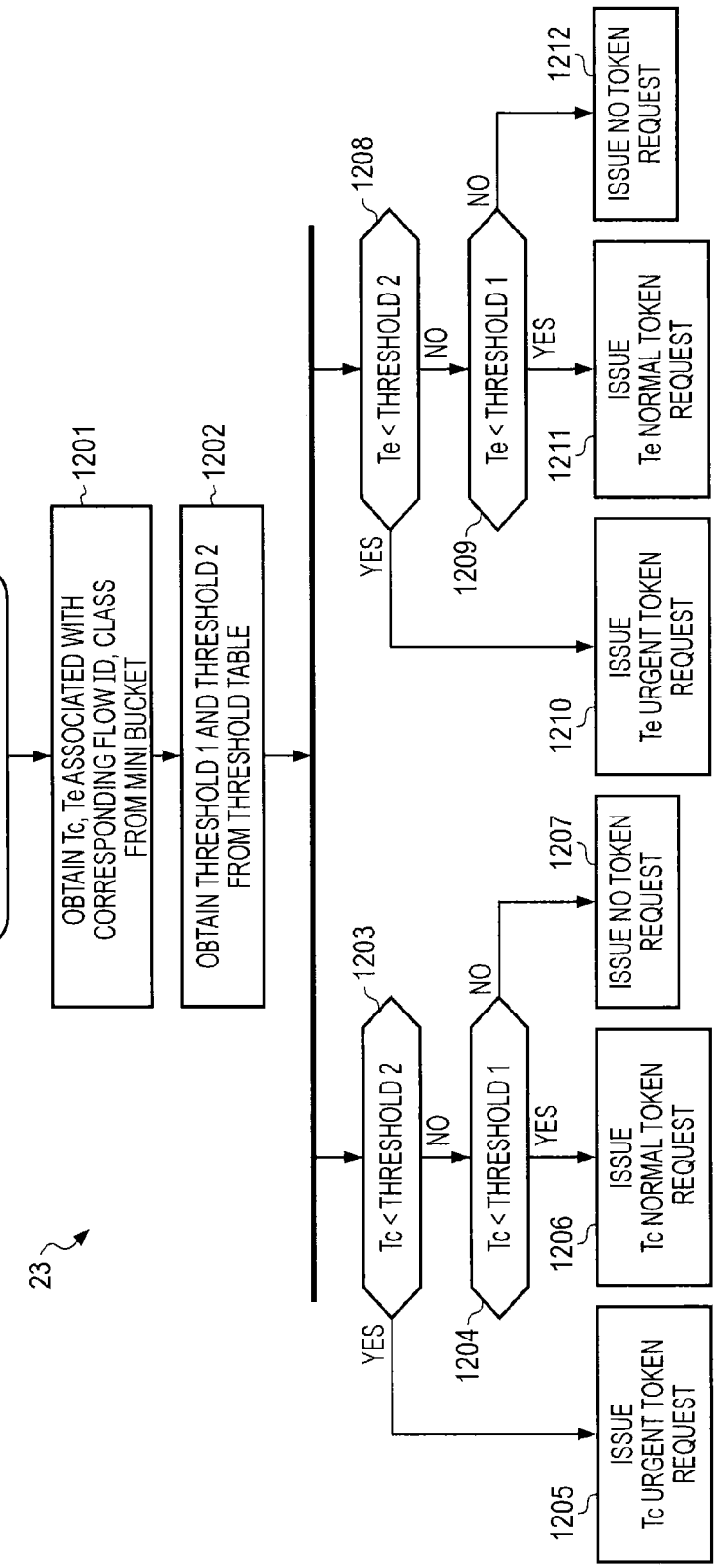
FIG. 12 is a diagram illustrating an example of an operational flowchart performed by a token requesting unit, according to an embodiment.

FIG. 12 is a diagram illustrating an example of an operational flowchart performed by a token requesting unit, according to an embodiment. The token requesting unit 23 starts processing upon being notified by the policing processing unit 21 that the remaining token amounts Tc and Te have been updated. FIG. 12 illustrates an operational flowchart performed by the token requesting unit 23.

In operation S1201, the token requesting unit 23 reads out (obtains) Tc and Te information associated with the corresponding flow and class from the mini bucket 22 (as depicted by S4 in FIG. 10).

In operation S1202, the token requesting unit 23 reads out (obtains) the threshold 1 and the threshold 2 from the threshold table 24.

The Tc and the Te are each compared with the threshold 2 and the threshold 1. When the Tc falls below the threshold 2 (YES in operation S1203), a Tc urgent token request is issued in operation S1205. When the Te falls below the threshold 2 (YES in operation S1208), a Te urgent token request is issued in operation S1210.

When the Tc is equal to or greater than the threshold 2 (NO in operation S1203) and less than the threshold 1 (YES in operation S1204), a Tc normal token request is issued in operation S1206. When the Te is equal to or greater than the threshold 2 (NO in operation S1208) and less than the threshold 1 (YES in operation S1209), a Te normal token request is issued in operation S1211.

When the Tc is equal to or greater than the threshold 2 (NO in operation S1203) and equal to or greater than the threshold 1 (NO in operation S1204), the processing is completed without performing any particular action, that is, no token request is issued (in operation S1207). When the Te is equal to or greater than the threshold 2 (NO in operation S1208) and equal to or greater than the threshold 1 (NO in operation S1209), the processing is completed without performing any particular action, that is, no token request os issued (in operation S1212).

FIG. 13 is a diagram illustrating an example of a token request packet, according to an embodiment. When a token request is issued, a token request packet is transmitted to the token supply unit 32 from the token requesting unit 23 (as depicted by S5 in FIG. 10). In this case, the token request packet may be transmitted using a packet format within the policer.

The token request packet may be configured to include a "distribution pol #", a flow identifier "FID", a class, Tc and/or Te, an urgent bit (e.g., 1 or 0), and a request token amount. The "distribution pol #" indicates a number assigned to one of distribution policing units (#1 to #3) 20 that has issued the token request. The urgent bit indicates whether the issued token request is an urgent request or a normal request, and takes on a value, for example, 1 or 0. The request token amount indicates the amount of tokens to be supplied, and represented, for example, in units of a fixed amount of 1 kilobyte.

The token request packets transmitted from the token requesting unit 23 to the token supply unit 32 are temporarily stored in a request waiting buffer 35. In this case, a token request packet with an urgent bit having a value of 1 is stored in the urgent queue, and a token request packet with an urgent bit having a value of 0 is stored in the normal queue.

Processing of reading out the token request packets from the request waiting buffer 35 is performed at a speed according to the processing performed by the token supply unit 32. For example, when a time period equivalent to four clocks is needed for processing one token request packet by the token supply unit 32, a token request packet is read out every four clocks. The highest priority is given to processing of reading out token request packets from the urgent queue.

FIG. 14 is a diagram illustrating an example of an operational flowchart performed by a token supply unit, according to an embodiment. FIG. 14 illustrates an operational flowchart performed by a token supply unit 32 that has received a token request packet. In FIG. 14, although description is given of a token request for a remaining token amount Tc, similar processing is performed for a remaining token amount Te by replacing Tc with Te.

In operation S1401, the token supply unit 32 obtains, from the arrived token request packet, request source information, that is, information items of the "distribution pol #" (for example, the number assigned to distribution policing unit (#1) 20), the flow identifier FID, the class, and the Tc and/or the Te, and the request token amount.

In operation S1402, the token supply unit 32 obtains (reads out), from the main bucket 31, a Tc associated with the obtained flow identifier FID and the class (as depicted by S6 in FIG. 10).

In operation S1403, the request token amount and the Tc are compared. When Tc is equal to or greater than the request token amount (YES in operation S1403), in operation S1404, tokens comparable to the requested token amount are supplied to the mini bucket 22 for the request source, the request token amount is subtracted from the Tc, and the updated Tc value as a result of the subtraction is rewritten into the main bucket 31 (as depicted by S7 and S8 in FIG. 10).

Meanwhile, when the Tc is less than the request token amount (NO in operation S1403), in operation S1405, tokens corresponding to a value obtained by rounding off a value less than 1 kB from the Tc, that is, tokens corresponding to a value not exceeding the Tc in units of 1 kB, are supplied to the mini bucket 22 for the request source.

Further, in operation S1405, the amount of supplied tokens is subtracted from the Tc. The amount of tokens that have failed to be supplied, that is, a value obtained by subtracting the amount of supplied tokens (supply token amount) from the amount of requested tokens (request token amount), is written as "request byte" in a request state management table 33 as illustrated in FIG. 15, and a flag ("request flag") indicating that tokens are being requested is set in the request state management table 33. For example, when the request token amount is 5000 bytes and the Tc is 3200 bytes, the Tc falls below the request token amount and it is impossible to supply tokens whose amount meets the request token amount. In this case, 3000 bytes of tokens, which is the amount of tokens corresponding to a value not exceeding the Tc in units of 1 kB, are supplied.

Further, in this case, the Tc of 200 bytes (3200−3000=200 bytes) is rewritten into the main bucket 31, and a value indicating the amount of tokens that have failed to be supplied, that is, 5000−3000=2000 bytes, is written into the request state management table 33.

As described above, in the policer PL10, upon arrival of a packet, a sequence of operations from policing the packet to supplying the tokens is performed. Meanwhile, the token adding unit 34 periodically performs token-addition processing for each flow and class, independently of the sequence of operations from policing the packet upon arrival of the packet to the supply of tokens.

FIG. 16 is a diagram illustrating an example of an operational flowchart performed by a token addition unit, according to an embodiment. FIG. 16 illustrates an operational flowchart performed by a token addition unit 34. Although an example of supplying tokens with respect to a remaining token amount Tc is described in FIG. 16, similar processing is performed for supplying tokens with respect to a remaining token amount Te, by replacing Tc with Te.

In operation S1601, the token addition unit 34 obtains a Tc associated with the corresponding flow identifier FID and class from the main bucket 31 (as depicted by S9 in FIG. 10).

In operation S1602, the corresponding flow identifier FID and class, and the request flags for all the distribution policing units 20 associated with the obtained Tc are obtained from the request state management table 33 (as depicted by S10 in FIG. 10). In the example of FIG. 15, three request flags are obtained from the request state management table 33.

Next, the amount of tokens to be added periodically (a periodic addition token amount) is added to the Tc. The periodic addition token amount is a value uniquely determined on the basis of the CIR value that has been set.

In operation S1603, the updated Tc value is rewritten in the main bucket 31 (as depicted by S11 in FIG. 10).

In operations S1604 and S1605, it is determined whether the Tc is equal to or greater than 1 kB (in operation S1605) and whether at least one request flag has been set at 1 (at least one request flag=1) (in operation S 1605). When the above two conditions are satisfied, token supply processing to the mini bucket 22 is started since the conditions indicate that although tokens were exhausted in the main bucket 31, tokens have been accumulated up to the amount that are allowed to be supplied.

In the case, it is assumed that the token supply processing is performed in a manner similar to that of the case where a token request is issued from the distribution policing unit (#1) 20. That is, when the above two conditions are satisfied, a packet having the same format as a token request packet transmitted from the token requesting unit 23 is sent from the token adding unit 34 through the request waiting buffer 35 to the token supply unit 32 as a token supply instruction (as depicted by S12 in FIG. 10). In this case, a flow identifier FID, a class, and a Tc, which have been used and updated by the token addition unit 34, are used as those to be set to the token supply instruction, and, for example, a number that is not used for a normal distribution policing unit (for example, 0) is set as the number indicating a distribution policing units 20. This causes the token supply unit 32 to invoke the token supply processing. Meanwhile, when the above two conditions are not satisfied (NO in operation S1604 or S1605), a token supply instruction (a token request packet) is not sent from the token adding unit 34 to the token supply unit 32 (in operation S1607), that is, tokens are not supplied.

FIG. 17 is a diagram illustrating an example of an operational flowchart performed by a token supply unit, according to an embodiment. FIG. 17 illustrates operating procedures when the token supply unit 32 receives the token supply instruction (a token request) from the token adding unit 34. In the case, the token supply unit 32 checks a number (identifier) identifying a distribution policing unit 20 ("distribution pol#") stored in the token supply instruction (the token request packet), and selects and performs the operational flowchart illustrated in FIG. 17, for example, when the "distribution pol#" is set at 0.

In operation S1701, upon arrival of a token request packet, the token supply unit 32 obtains the distribution policing unit 20 number ("distribution pol#"), the flow identifier FID, the class, the Tc and/or the Te, and the request token amount, from the token request packet, in the same way as a normal token request from the distribution policing units (#1 to #3) 20. In the case, "distribution pol#" is set at 0.

In operation S1702, the token supply unit 32 obtains, from the main bucket 31, a Tc associated with the corresponding flow identifier FID and the class obtained from the token request packet.

In operation S1703, the token supply unit 32 obtains, from the request state management table 33, all the distribution policing units 20 numbers associated with the corresponding flow identifier FID, the class, the Tc and/or the Te, and further obtains the request flags and the request bytes for all the obtained distribution policing unit 20 numbers from the request state management table 33 (as depicted by S13 in FIG. 10).

In operation S1704, the token supply unit 32 selects the distribution policing unit (pol_n) 20 with the largest amount of "request byte" from among all the distribution policing units 20.

In operation S1705, the token supply unit 32 compares the Tc with the request byte value of the selected distribution policing unit (pol_n) 20. When the Tc is less than the request byte value (NO in operation S1705), in operation S1706, the token supply unit 32 supplies tokens whose amount is the upper limit (in 1-kB units) that is allowed to be supplied from the Tc, to the distribution policing unit (pol_n) 20. Then, the token supply unit 32 completes the token supply processing by subtracting the amount of supplied tokens from each of the Tc in the main bucket 31 and the "request byte" of distribution policing unit (pol_n) 20 in the request state management table 33.

Meanwhile, when the Tc is equal to or greater than the request byte value (YES in operation S1705), in operation S1707, the requested byte amount of tokens is supplied to the distribution policing unit (pol_n) 20, and the requested byte amount of tokens is subtracted from the Tc. Then, the token supply unit 32 updates the request state management table 33 by setting each of the request flag and the request byte value of the distribution policing unit (pol_n) 20 at zero.

In operation S1708, the token supply unit 32 checks whether there exist other distribution policing units 20 with a request flag set at 1. When there exists a distribution policing unit 20 with a request flag set at 1 (YES in operation S1708), the processing returns to the operation S1704 to select a distribution policing unit 20. When there exists no distribution policing unit 20 with a request flag set at 1 (NO in operation S1708), the token supply processing is finished in operation S1709. In this way, supply of tokens to the main bucket 31 may cause tokens to be supplied to the mini bucket 22.

With the policer PL10 of the abovementioned embodiment, a processing load is distributed among the plurality of distribution policing units 20 using the packet distributor 15 and the concentrated token management unit 30 comprehensively adds and subtracts tokens. This allows reducing a processing load for the distribution policing units 20 that needs to perform processing in packet units.

For example, when the policer PL10 using a 100 gigabyte Ethernet interface (100 GE-IF) is equipped with three distribution policing units (#1 to #3) 20, a simple 2-rate 3-color policing process may be performed, at a maximum, at a processing speed equal to 49.6 Mpps (148.8 Mpps/3=49.6 Mpps).

Further, the concentrated token management unit 30 that performs comprehensive token processing is separated from processing performed in packet units, and an average processing load may be reduced since processing may be performed in relatively large fixed amount units for each token request. For example, when the fixed amount is 1000 bytes, processing may be performed at a processing speed equal to 12.5 Mpps (from 100 Gbps (1000 bytes×8)=12.5 Mpps).

Moreover, policing accuracy is not hindered due to biased packet distribution arising from a simple load distribution since comprehensive token processing is performed for each flow by the concentrated token management unit 30. In this way, by functionally dividing policing operations and adjusting within the policer a position of processing that needs a higher processing speed, the individual processing performance may be reduced while realizing high-speed processing throughout as the whole policer.

The policer PL10 with the abovementioned configuration is able to temporarily equalize bursty token requests, thereby reducing a processing load for the concentrated token management unit 30.

The token supply priority control mentioned above allows tokens to be supplied on a priority basis to the mini bucket 22 that has high urgency of being immediately supplied with tokens, thereby reducing a probability that packet loss will occur despite that there exist available tokens left in the main bucket 31.

When the token supply candidate determination control mentioned above is used, the scale of circuits may be reduced due to a simple mechanism thereof. Moreover, a disproportionate supply to specific distribution policing units 20 may be reduced and policing accuracy may be improved.

Modified Example

The processing of the abovementioned embodiment may be provided as a computer-readable program via a non-transitory computer readable recording medium such as a CD-ROM or a floppy disk and the like, or via a communication line.

Processes in the abovementioned embodiment may be implemented by selecting any or all of the processes and by combining the selected ones.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for policing traffic in a communication network, the apparatus comprising:
one or more processors configured to:
evenly distribute packets that have arrived at the apparatus, among a plurality of policing processors;
the plurality of policing processors each configured:
to determine whether a received packet is permitted to be passed or discarded, in accordance with an amount of tokens remaining in a first token bucket provided for the respective policing processor, and
to issue a token request for requesting supply of tokens when an amount of tokens remaining in the first token bucket falls below a first threshold value; and
to supply tokens in units of a predetermined amount to the first token bucket for which the token request has been issued, the tokens being supplied from a second token bucket in accordance with an amount of tokens remaining in the second bucket, wherein
when it is determined that the second bucket does not hold tokens in an amount that is equal to or greater than an amount of tokens requested by the token request issued the respective policing processor, information indicating that the token request has been issued is stored in a request state management table, and when a sufficient amount of tokens have been accumulated in the second bucket, the predetermined amount of tokens is supplied to the first token bucket of the respective policing processor.

2. The apparatus of claim 1, further comprising:
a request-waiting buffer that temporarily stores the token request issued by policing processor before performing token-supply processing on the token request, the request-waiting buffer being configured to include a normal queue and an urgent queue, the urgent queue storing token requests that are to be read out on a priority basis.

3. The apparatus of claim 2, wherein
a second threshold value is set for each policing processor; and
when an amount of tokens remaining in the first token bucket falls below the second threshold value, the token request issued by each policing processor is stored in the urgent queue.

4. The apparatus of claim 1, wherein
when there exist two or more policing processors each having issued the token request, tokens are supplied to the first token bucket provided for a policing processor that is selected based on predetermined order from among the two or more policing processors.

5. The apparatus of claim 1, wherein
when there exist two or more policing processors each having issued the token request, tokens are supplied to the first token bucket provided for a policing processor that has issued the token request requesting supply of tokens whose amount is largest among the two or more policing processors.

6. The apparatus of claim 1, wherein
the first and second token buckets are formed in first and second memories, respectively, the first and second memories each storing tokens associated with a flow of traffic and a class of traffic.

7. The apparatus of claim 1, wherein
when each policing processor has determined that a distributed packet is permitted to be passed, each policing processor performs token-subtraction processing that subtracts tokens whose amount corresponds to a byte length of the packet to be passed, from tokens remaining in the first bucket provided for each policing processor.

8. The apparatus of claim 1, wherein
when it is determined that the second bucket holds tokens whose amount is equal to or greater than an amount of tokens requested by the token request issued by each policing processor, tokens are supplied, to the first token bucket, that are extracted from the second token bucket, while subtracting, from the second token bucket, tokens whose amount is equal to an amount of tokens supplied to the first token bucket.

9. The apparatus of claim 1, wherein to the one or more processors are further configured to periodically add tokens to the second bucket.

* * * * *